(12) United States Patent
Bavelloni

(10) Patent No.: US 7,472,636 B2
(45) Date of Patent: Jan. 6, 2009

(54) METHOD FOR LOADING AND CUTTING GLASS SHEETS ON CUTTING TABLES

(75) Inventor: Franco Bavelloni, San Fermo Della Battaglia (IT)

(73) Assignee: Z. Bavelloni S;p.A., Bregnano (IT)

( * ) Notice: Subject to any disclaimer, the term of this patent is extended or adjusted under 35 U.S.C. 154(b) by 115 days.

(21) Appl. No.: 11/142,289

(22) Filed: Jun. 2, 2005

(65) Prior Publication Data

US 2005/0279199 A1 Dec. 22, 2005

(30) Foreign Application Priority Data

Jun. 22, 2004 (IT) .......................... MI2004A1250

(51) Int. Cl.
B26D 3/08 (2006.01)
(52) U.S. Cl. ............... 83/879; 83/13; 83/733; 225/96; 414/797
(58) Field of Classification Search ............ 83/13, 83/152, 98, 100, 733; 225/1–5, 93–106; 414/793, 797, 627, 737, 752.1
See application file for complete search history.

(56) References Cited

U.S. PATENT DOCUMENTS

| | | | | |
|---|---|---|---|---|
| 3,279,664 A | * | 10/1966 | Lynch ..................... | 225/96.5 |
| 4,863,340 A | * | 9/1989 | Masunaga et al. ........ | 414/789.5 |
| 5,030,059 A | * | 7/1991 | Favre .................... | 414/798.5 |
| 5,105,759 A | * | 4/1992 | Sauvinet et al. ........... | 118/308 |
| 5,433,818 A | * | 7/1995 | Lee ....................... | 156/576 |
| 5,943,113 A | * | 8/1999 | Ichihashi ................. | 349/187 |
| 5,984,624 A | * | 11/1999 | Opfer et al. ............. | 414/798.5 |
| 7,131,562 B2 | * | 11/2006 | Ueyama et al. .......... | 225/96.5 |

FOREIGN PATENT DOCUMENTS

| | | |
|---|---|---|
| DE | 29 03 364 A1 | 8/1980 |
| DE | 94 04 785 U1 | 5/1994 |
| EP | 0 642 998 A | 3/1995 |
| EP | 0 673 890 A | 9/1995 |
| EP | 1 101 743 A | 5/2001 |

OTHER PUBLICATIONS

Patent Abstracts of Japan vol. 2000, No. 13, Feb. 5, 2001 -& JP 2000 281372 A (Mitsuboshi Diamond Industrial Co Ltd; TooHoo Seisakusho; KK), Oct. 10, 2000 . . . .
Patent Abstracts of Japan vol. 2000, No. 24, May 11, 2001 -& JP 2001 180822 A (Kanegafuchi Chem Ind Co Ltd), Jul. 3, 2003 *abstract; figures 1, 2, 6 *.

* cited by examiner

*Primary Examiner*—Kenneth E. Peterson
(74) *Attorney, Agent, or Firm*—Modiano & Associati; Albert Josif; Daniel J. O'Byrne

(57) ABSTRACT

A method for loading and cutting glass sheets on a cutting table, that includes the steps of: providing, with a scoring head, scoring lines on a first sheet of glass positioned on the cutting table; extracting, during the scoring step, sucker-fitted pick-up arms from below the first sheet being worked; tilting the pick-up arms so as to place the suckers on a second sheet to be picked up, which is arranged substantially vertically adjacent the scoring table; picking up the second sheet, starting to tilt it toward the cutting table during the scoring of the first sheet; moving the scored first sheet away from the cutting table; positioning the scoring head beyond a sheet supporting region, on an opposite side with respect to a pick-up region; and positioning the second sheet on the cutting table.

10 Claims, 11 Drawing Sheets

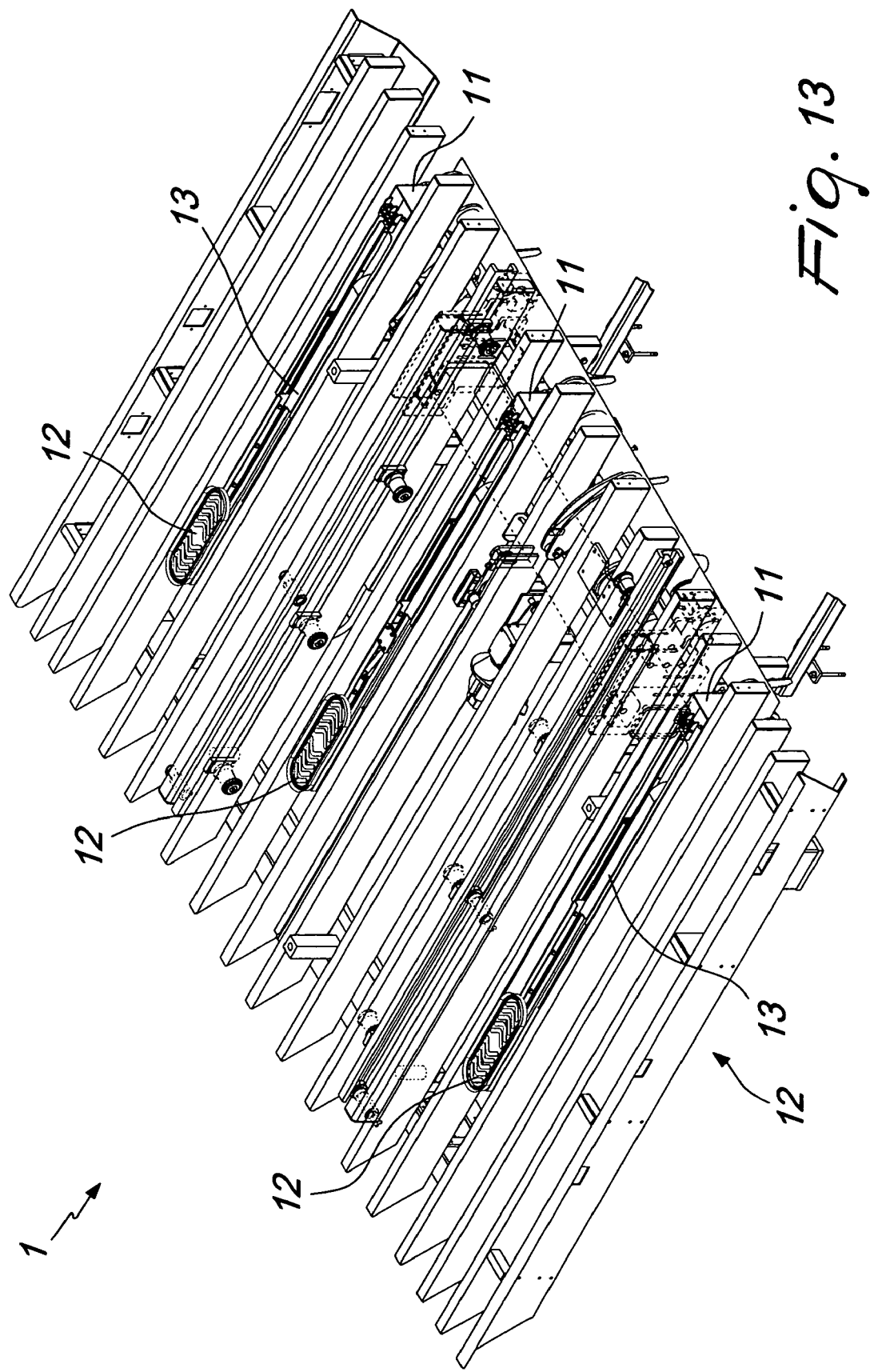

METHOD FOR LOADING AND CUTTING GLASS SHEETS ON CUTTING TABLES

The present invention relates to a method for loading and cutting glass sheets on cutting tables.

BACKGROUND OF THE INVENTION

As is known, cutting tables are commercially available which are provided with arms fitted with suckers that pick up the sheets to be cut, that are positioned initially on a supporting stand arranged laterally with respect to the cutting table and are arranged substantially vertically on said stand.

The sucker-fitted arms are preset to pick up the sheet to be cut and to turn it over onto the cutting table.

With conventional tables, the scoring head is activated first and is usually provided on a bridge-like element that lies above the cutting surface; once scoring has been performed, the head is arranged at the end of the sheet toward the sheet loading stand and expels, by performing a translational motion, the sheet toward the opposite side.

Once the sheet has been moved away from the cutting surface, the sucker-fitted arms are extracted and pick up the new sheet and deposit it onto the working surface, repeating the cycle.

With this type of tables, there is considerable idle time due to the arm tilting and pick-up step, which must be performed after the previous scored sheet has been removed from the cutting table.

It is evident that this method entails long times, which obviously have a negative effect on costs.

SUMMARY OF THE INVENTION

The aim of the invention is to solve the problems described above by providing a method for loading and cutting glass sheets on cutting tables that allows to minimize idle times with the possibility to move the arms during scoring of the sheet.

Within this aim, an object of the invention is to provide a cutting table that allows to retain compact dimensions, which facilitate its transport, and to avoid causing interference between the scoring step and the arm movement step.

Another object of the present invention is to provide a cutting table that allows to pick up the sheets from the stand without causing any damage to the edges.

Another object of the present invention is to provide a cutting table that thanks to its particular constructive characteristics is capable of giving the greatest assurances of reliability and safety in use.

This aim and these and other objects that will become better apparent hereinafter are achieved by a method for loading and cutting glass sheets on cutting tables, characterized in that it comprises the steps of: providing, by means of a scoring head, scoring lines on a sheet of glass and the like; extracting, during the scoring step, sucker-fitted pick-up arms from below the sheet being worked; tilting the pick-up arms so as to place the suckers onto the sheet to be picked up, which is arranged substantially vertically; picking up the sheet, starting to tilt it toward the cutting table during the scoring of the sheet that is present on the table; moving the scored sheet away from the table; positioning the scoring head beyond the sheet supporting region, on the opposite side with respect to the pick-up region; and positioning the sheet on said cutting table.

BRIEF DESCRIPTION OF THE DRAWINGS

Further characteristics and advantages will become better apparent from the description of a preferred but not exclusive embodiment of a method for loading and cutting glass sheets on cutting tables, according to the invention, illustrated by way of non-limiting example in the accompanying drawings, wherein:

FIG. 13 is a schematic perspective view of the sucker-fitted arms arranged on the cutting surface.

DESCRIPTION OF THE PREFERRED EMBODIMENTS

Figure 1:
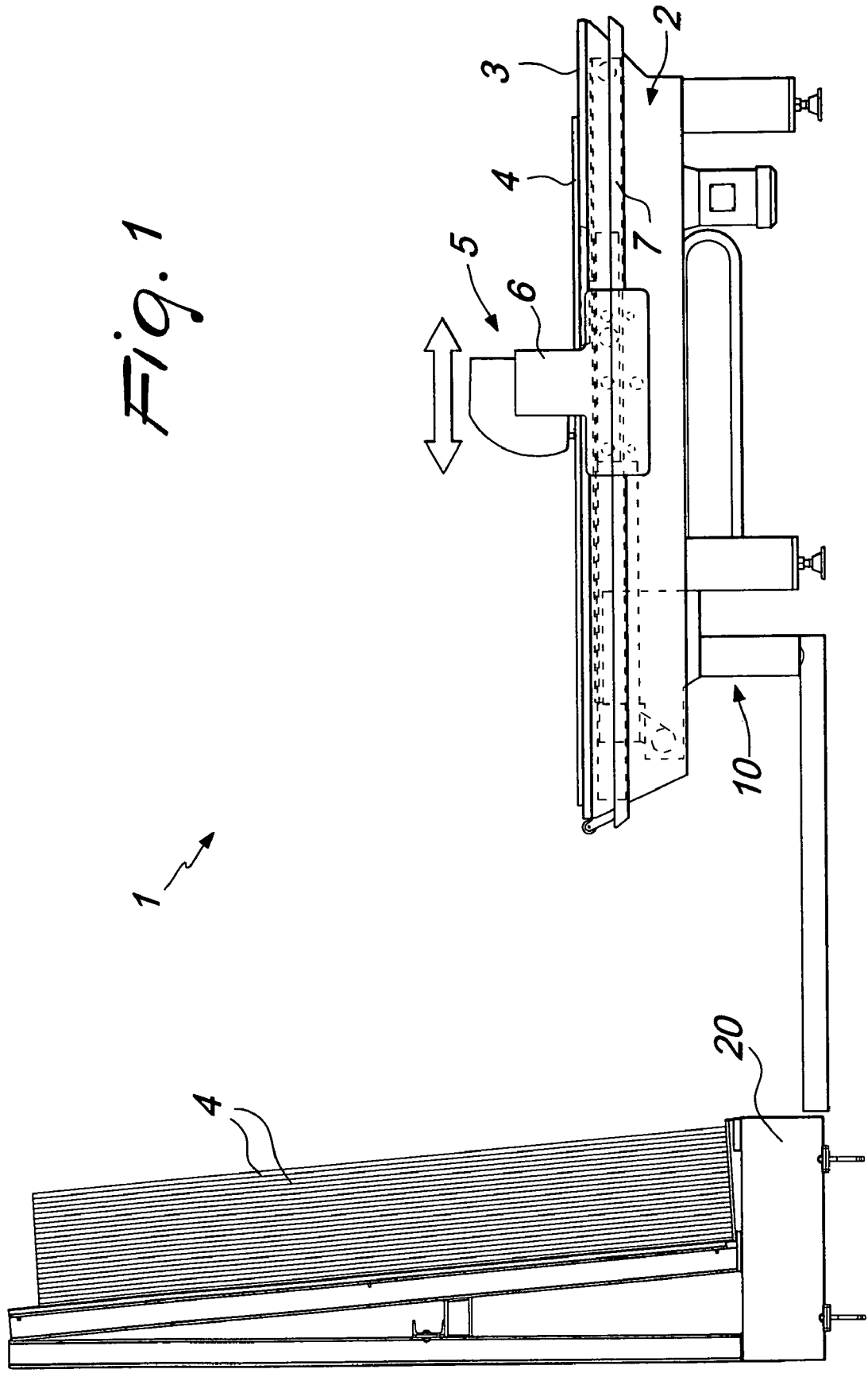
FIG. 1 is a schematic view of the cutting table during the sheet scoring step.
Figure 2:
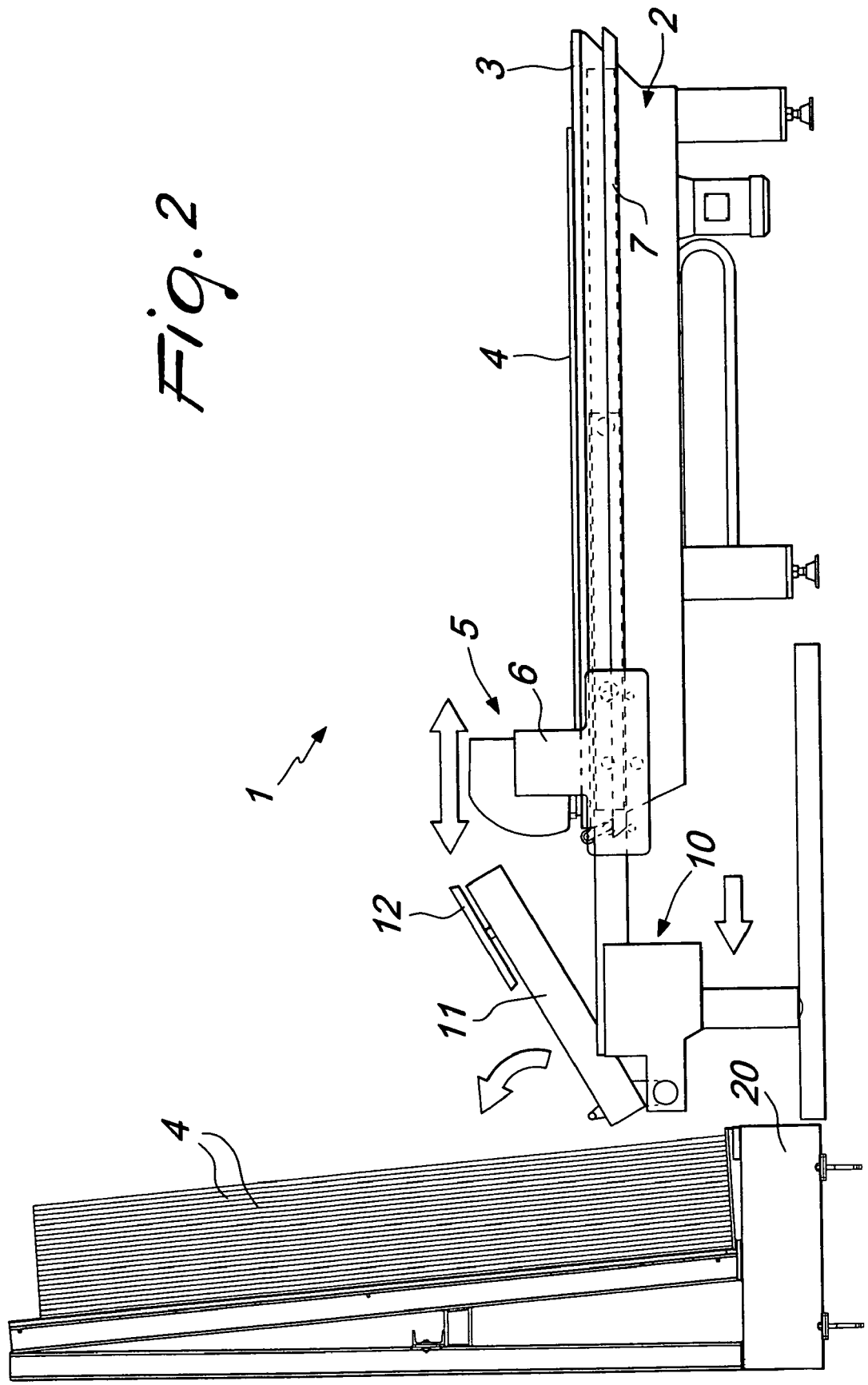
FIG. 2 is a view of the initial step for extraction of the arms from the cutting table.

With reference to the figures, the cutting table for sheets of glass and the like, generally designated by the reference numeral 1, comprises a supporting frame 2, which forms, in an upward region, a cutting surface 3 on which the sheet 4 to be scored by means of a head 5 is to be positioned; said head 5 can move on a bridge 6, which can move on the frame 2 by way of guides 7, which are for example of the type disclosed in U.S. Ser. No. 11/086,344.

The particular connection that is used allows to ship the cutting table in conventional containers without having to perform disassembly, since the table is arranged at an angle so that the tubular elements that compose its structure lie along the diagonal of the container, further allowing relatively large working surface sizes.

The particularity of the table according to the invention consists in that it has a carriage 10, whereto arms 11 are pivoted which are provided with suckers 12 connected to the arms 11 by means of telescopic portions 13, which allow to extract the arm by elongation.

The carriage 10, as shown in the drawings, can slide in the arm extraction direction, below the sheet being worked, during the step for the scoring of the sheet on the part of the head 5, and can be arranged at the stand 20 for supporting the sheets to be picked up.

Figure 3:
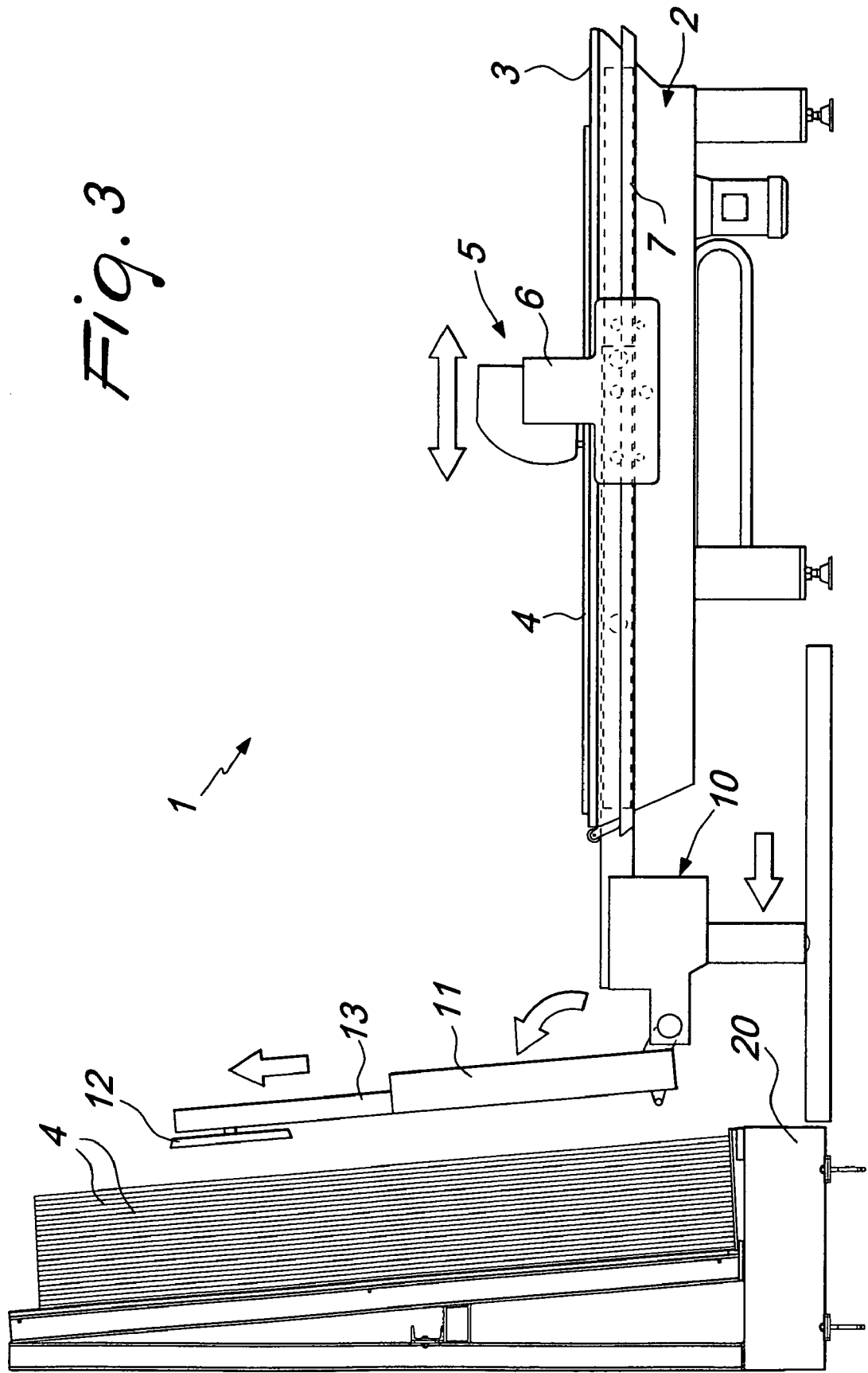
FIG. 3 is a view of the step for the extension of the sucker-fitted arms.

As shown in FIG. 3, once the arms 11 have been extracted from below the sheet, they are turned over and the extension portions 13 are extended telescopically from the arms 11, so as to move the suckers in order to engage the sheet.

Figure 4:
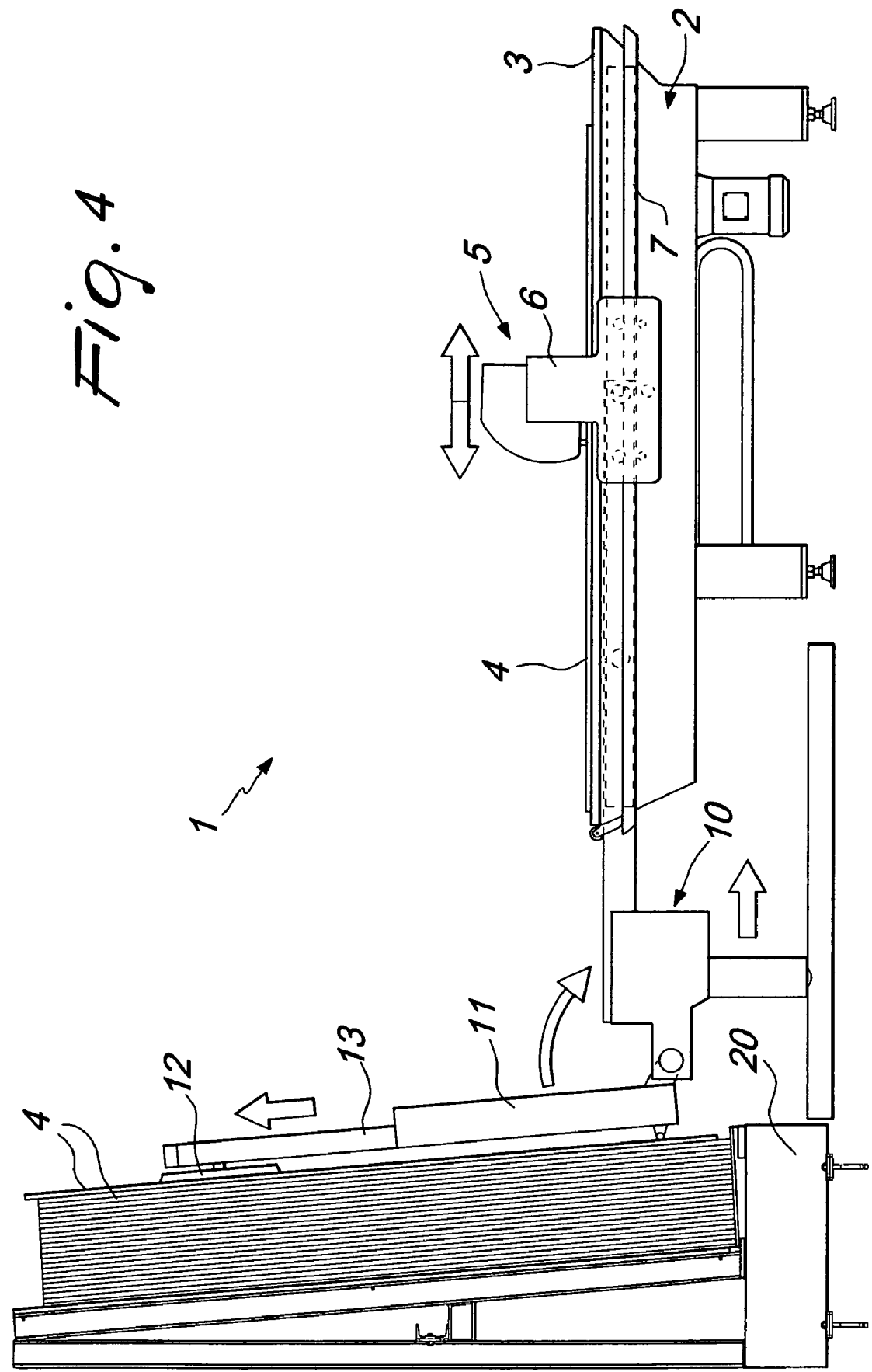
FIG. 4 is a schematic view of the step for lifting the sheet to be scored from the stand.

The portions 13, once the suckers 12 have engaged the sheet, as shown in FIG. 4, have an overtravel that allows to lift the sheet before picking it up.

This fact is extremely important, since it prevents accidental chipping or breakage at the supporting edge.

Figure 5:
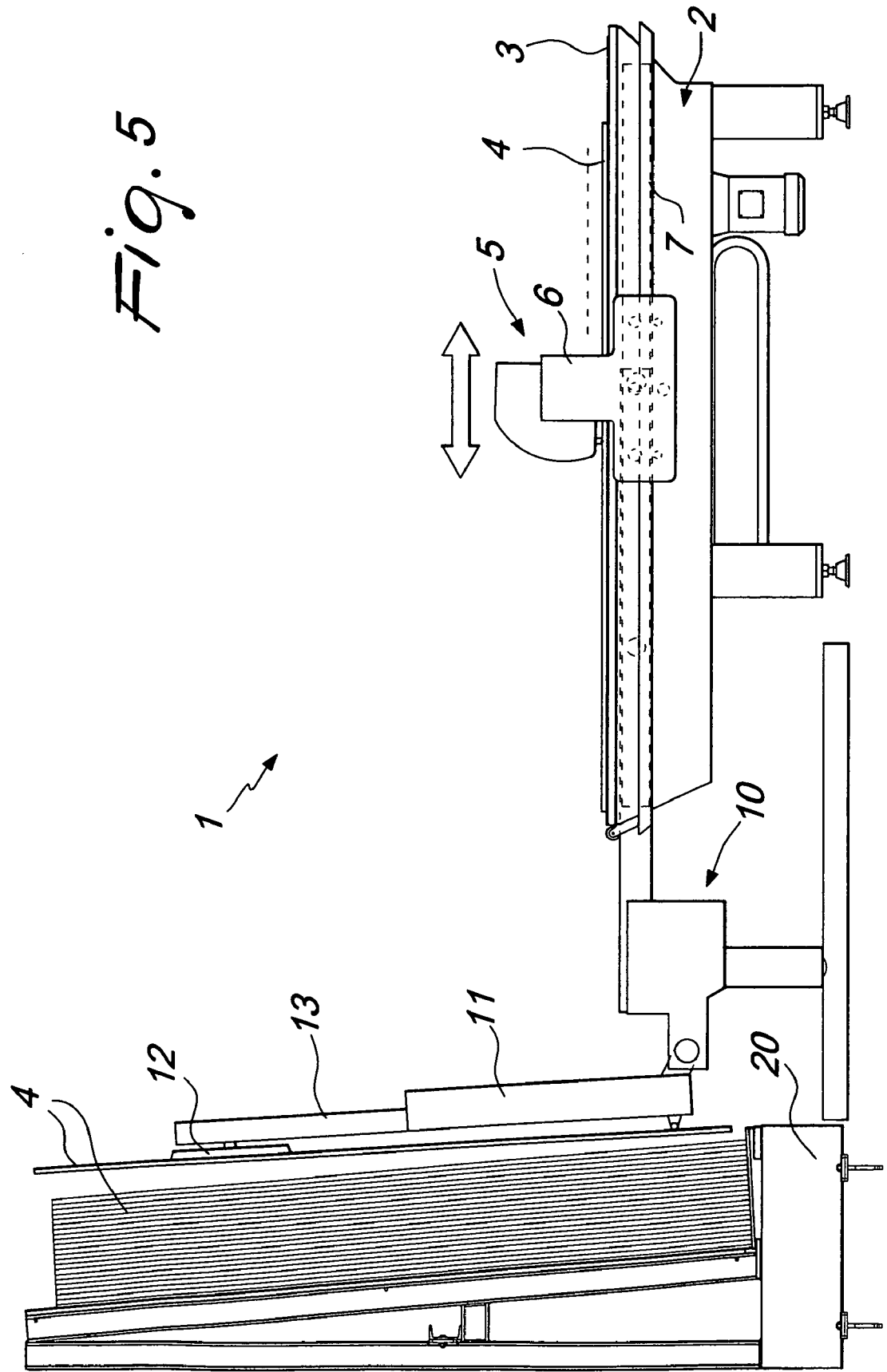
FIG. 5 is a view of the initial step for separation of the sheet to be scored from the stand.
Figure 6:
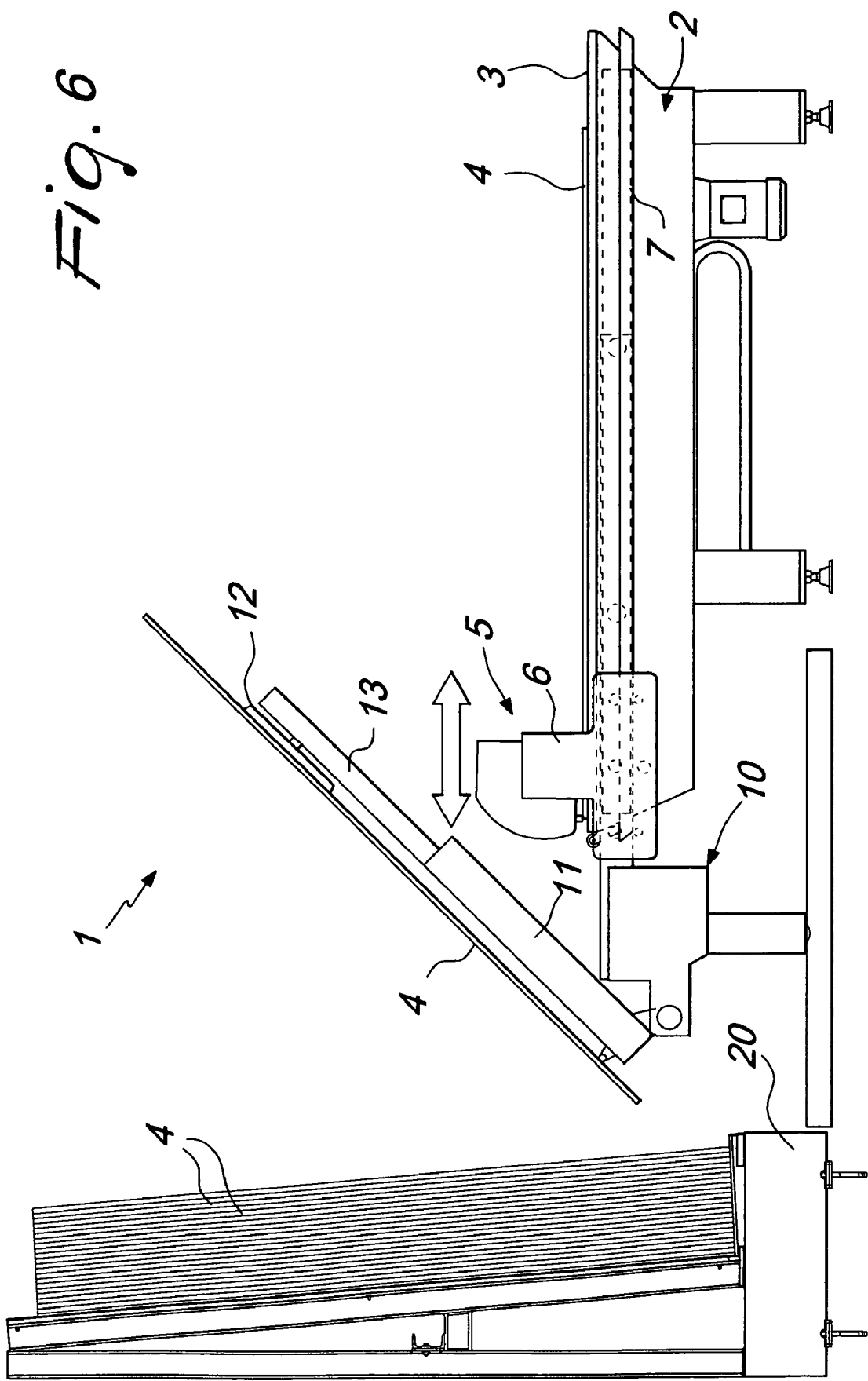
FIG. 6 is a view of the initial step for tilting the sheet toward the cutting table.

Once the sheet has been picked up (FIG. 5), the carriage 10 is moved toward the cutting surface and at the same time tilting of the arms 11 begins in order to move the picked-up sheet 4 toward the horizontal arrangement (FIG. 6).

Figure 7:
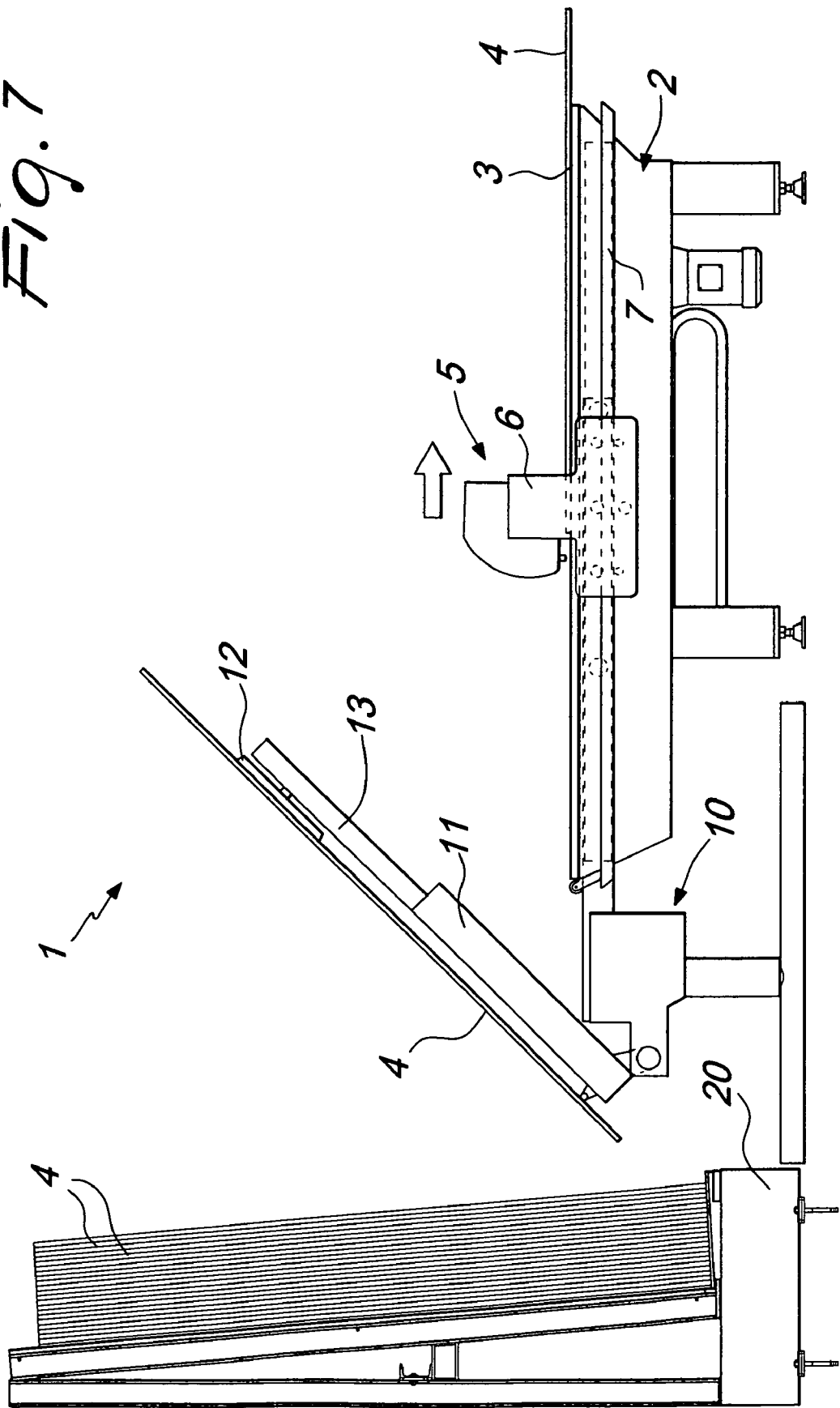
FIG. 7 is a view of the step for removing the scored sheet.
Figure 8:
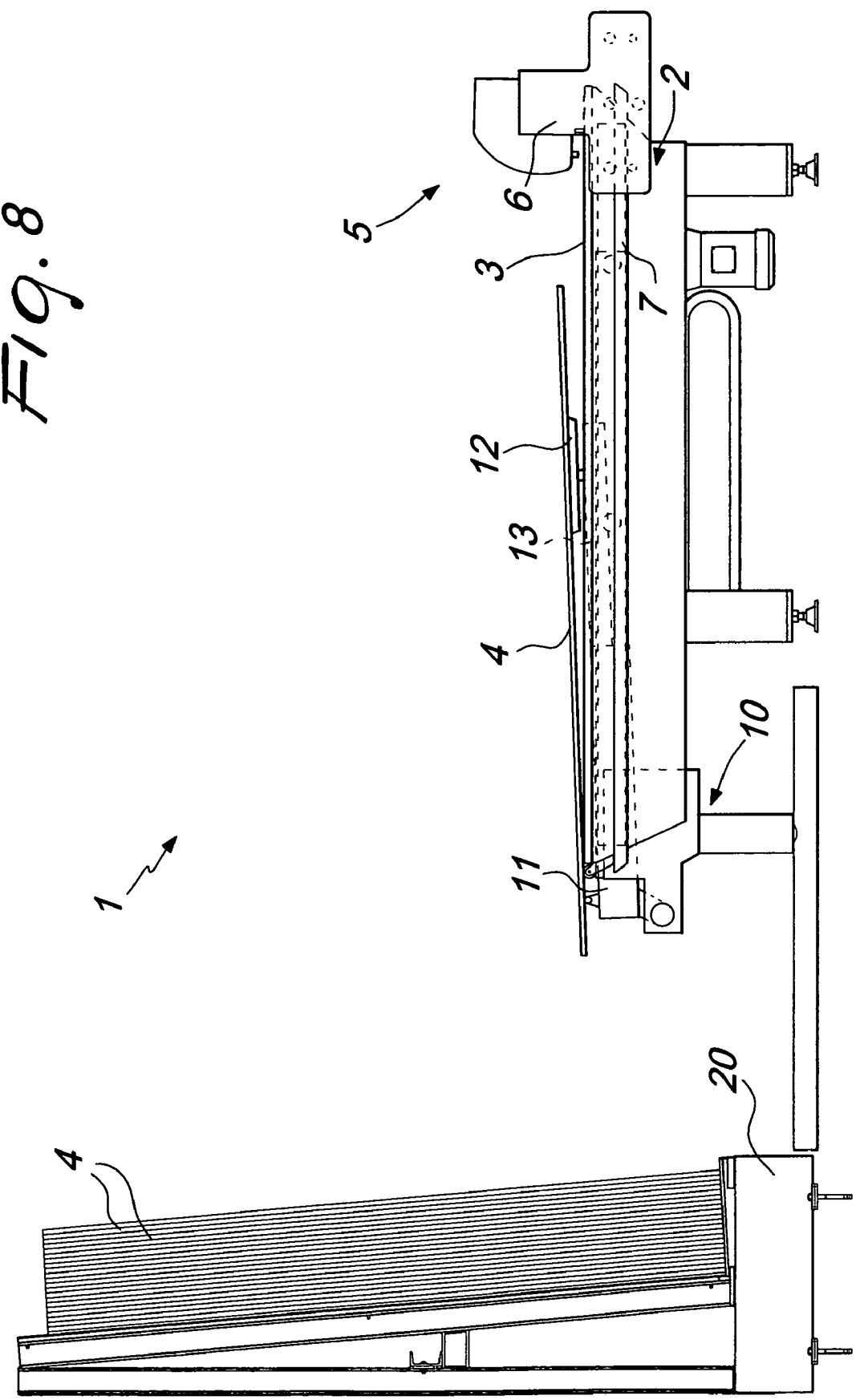
FIG. 8 is a view of the placement of the sheet onto the cutting table.
Figure 9:
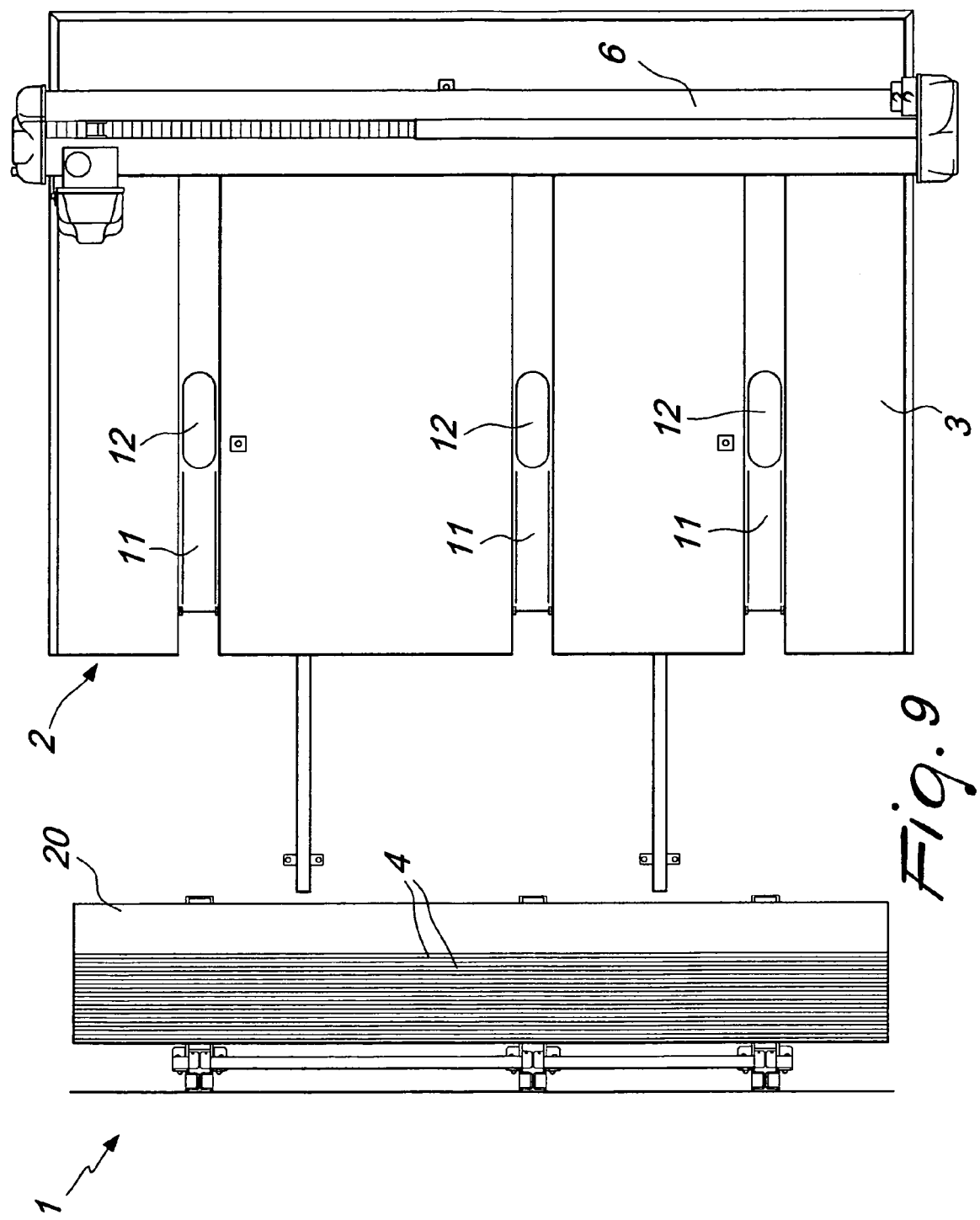
FIG. 9 is a schematic plan view of the cutting table.
Figure 10:
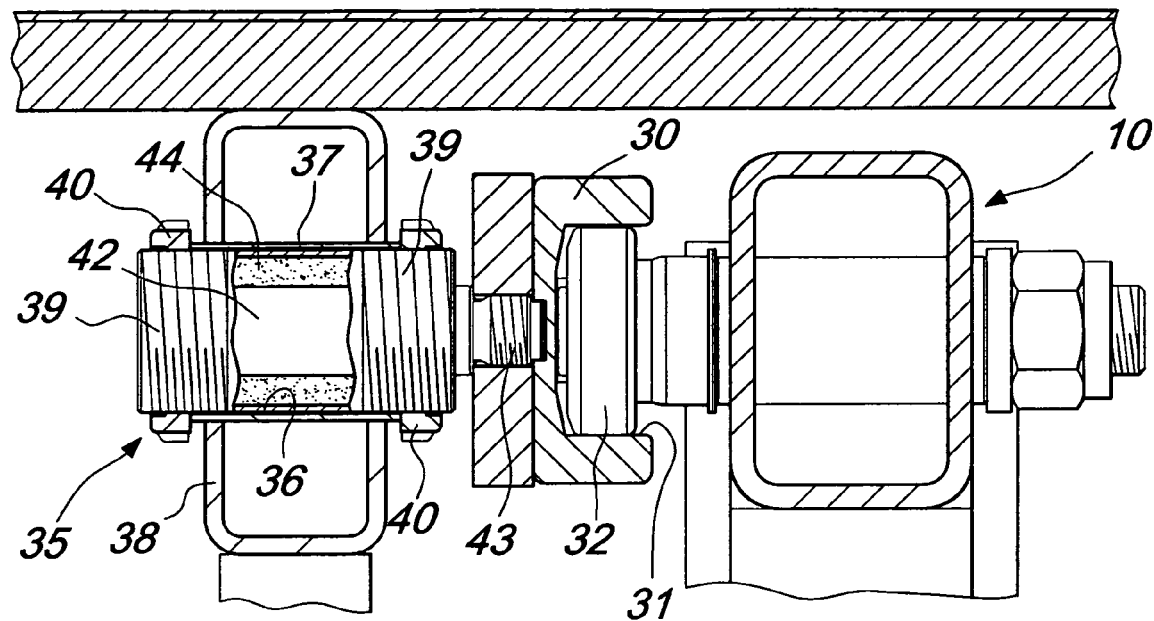
FIG. 10 is a schematic sectional view of the detail of the connection of the arm supporting carriage.
Figure 11:
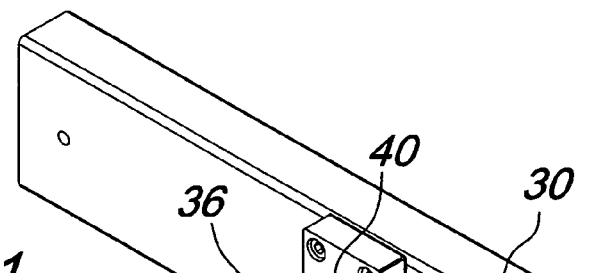
FIG. 11 is a perspective view, taken from one side, of the carriage guiding bar.
Figure 12:
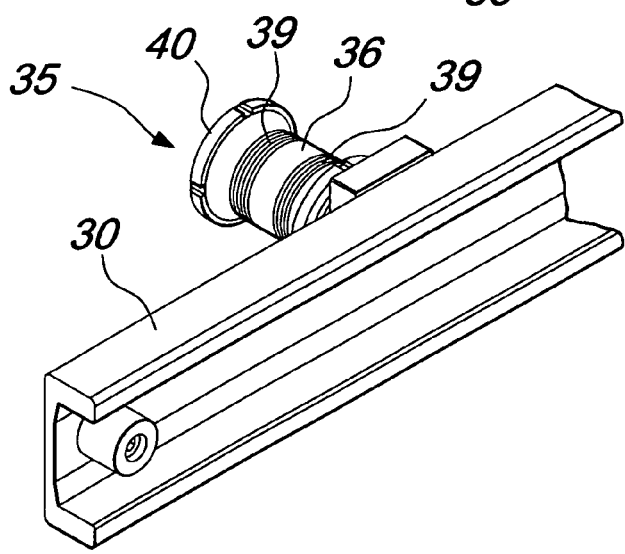
FIG. 12 is a perspective view, taken from the other side, of the carriage guiding bar.

At the same time, the head 5, by means of the bridge 6, is arranged at the edge of the scored sheet that is directed toward the stand and the sheet is expelled by means of the translational motion of the bridge 6 (FIG. 7); at the same time, tilting of the arms 11 begins, with a simultaneous further retracting approach of the carriage 10 (FIG. 8), until the sheet is correctly positioned onto the cutting surface.

Once positioning has been performed, the head 5, which is arranged at the edge of the cutting surface that lies opposite the edge directed toward the stand, performs the normal scoring step, repeating the initial cycle.

With the arrangement described above, therefore, idle times are drastically reduced, since the steps for extraction and tilting of the arms are performed during the scoring step; this is not possible with conventional types of tables.

It should be noted that the possibility to move the arms during scoring is allowed by the fact that there are means for blocking the vibrations that can be transmitted to the carriage-arm system during sheet loading and to the cutting table system.

These vibration blocking means, as shown more clearly in FIGS. 10 to 13, are provided with a guiding bar 30, which forms a seat 31 for engagement with the wheels 32 that support the carriage 10.

The guiding bars or guides 30 are provided with a plurality of pads, generally designated by the reference numeral 35, which are provided by means of a bush 36, which is inserted in a sleeve 37 that is rigidly coupled to a cross-member 38 of the frame 2.

The bush 36 has, at its ends, threaded portions 39, with which rings 40 for locking connection on the sleeve 37 engage.

Inside the bush 36 there is a pivot 42, which is provided with a threaded portion 43 for connection to the guide 30 and is supported in the bush by means of a cylindrical pad 44, advantageously made of an elastic material, such as adiprene rubber or the like, which is poured into the bush.

The presence of the vibration blocking means 35 is fundamentally important, since it prevents, during the step of translational motion of the carriage 10 and of movement of the arms, generation of vibrations which, if transmitted to the working surface, would cause the work of the scoring head to be unacceptable, as it would produce uneven cuts outside the allowed tolerances.

With the described arrangement, it is instead possible to perform the movement without having undue repercussions on the cutting surface.

Moreover, the fact that the guides are arranged below the cutting surface prevents them from interfering with the external dimensions of said table, without therefore compromising the shipping characteristics noted earlier.

From what has been described above, it is therefore evident that the invention achieves the intended aim and objects, and in particular the fact is stressed that a cutting table is provided which allows to drastically reduce production idle times and further allows to optimize transport and work.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements.

What is claimed is:

1. A method for loading and cutting glass sheets on a cutting table, comprising the steps of:
    slidably attaching a carriage to said cutting table and attaching sucker-fitted pick-up arms to said carriage;
    providing, by means of a scoring head, scoring lines on a first sheet of glass positioned on the cutting table;
    extracting, during scoring of said first sheet of glass, said sucker-fitted pick-up arms from below the first sheet being worked by moving said carriage with said pick-up arms attached thereto in a first translational direction parallel to a planar extension of the first sheet of glass positioned on the cutting table, and by telescopically retracting said sucker-fitted pick-up arms in said first translational direction,
    tilting and telescopically extending the sucker-fitted pick-up arms, the pick-up arms so as to place suckers thereof on a second sheet to be picked up, which is arranged substantially vertically adjacent the cutting table;
    picking up the second sheet, starting to tilt it toward the cutting table during the scoring of the first sheet that is present on the table;
    moving the scored first sheet away from the table during the tilting step of the second sheet toward the cutting table;
    positioning the scoring head beyond a sheet supporting region, on an opposite side with respect to a pick-up region; and
    positioning the second sheet on the cutting table including moving said carriage with said pick-up arms attached thereto in a second translational direction that is opposite to said first translational direction back toward said cutting table.

2. The method of claim 1, comprising performing an overtravel for elongation of the pick-up arms after engagement of the suckers with the second sheet to be picked up, in order to lift the second sheet from a supporting stand.

3. The method of claim 1, comprising extracting, during said scoring of said first sheet of glass, said sucker-fitted pick-up arms that are mounted to said carriage of the cutting table, the method further comprising the stop of blocking vibration transmission to a working surface of said cutting table during motion of said carriage and movement of said sucker-fitted pick-up arms.

4. The method of claim 1, comprising: extending the pick-up arms, with the suckers thereof telescopically before engagement with the second sheet;
    performing an overtravel for elongation of the pick-up arms after engagement of the suckers with the second sheet to be picked up, in order to lift the second sheet from a supporting stand;
    extracting, during said scoring of said first sheet of glass, said sucker-fitted pick-up arms that are mounted to said carriage of the cutting table; and
    blocking vibration transmission to a working surface of said cutting table during motion of said carriage and movement of said sucker-fitted pick-up arms.

5. A method for loading and cutting glass sheets on a cutting table, comprising the steps of:
    slidably attaching a carriage to said cutting table and attaching sucker-fitted pick-up arms to said carriage;
    providing, by means of a scoring head, scoring lines on a first sheet of glass positioned on the cutting table;

extracting, during scoring of said first sheet of glass, said sucker-fitted pick-up arms from below the first sheet being worked by moving said carriage with said pick-up arms attached thereto in a first translational direction parallel to a planar extension of the first sheet of glass positioned on the cutting table, and by telescopically retracting said sucker-fitted pick-up arms in said first translational direction, tilting and telescopically extending the sucker-fitted pick-up arms, the pick-up arms so as to place suckers thereof on a second sheet to be picked up, which is arranged substantially vertically adjacent the cutting table;

picking up the second sheet, starting to tilt it toward the cutting table during movement of the scored first sheet away from the cutting table;

positioning the scoring head beyond a sheet supporting region, on an opposite side with respect to a pick-up region; and positioning the second sheet on the cutting table including moving said carriage with said pick-up arms attached thereto in a second translational direction that is opposite to said first translation direction back toward said cutting table.

6. The method of claim 5, comprising performing an over-travel for elongation of the pick-up arms after engagement of the suckers with the second sheet to be picked up, in order to lift the second sheet from a supporting stand.

7. The method of claim 5, comprising extracting, during said scoring of said first sheet of glass, said sucker-fitted pick-up arms that are mounted to said carriage of the cutting table, the method further comprising the step of blocking vibration transmission to a working surface of said cutting table during motion of said carriage and movement of said sucker-fitted pick-up arms.

8. The method of claim 7, further comprising tilting the second sheet toward the cutting table during the scoring of the first sheet that is present on the table.

9. The method of claim 8, comprising performing an over-travel for elongation of the pick-up arms after engagement of the suckers with the second sheet to be picked up, in order to lift the second sheet from a supporting stand.

10. The method of claim 5, further comprising tilting the second sheet toward the cutting table during the scoring of the first sheet that is present on the table.

\* \* \* \* \*